(12) United States Patent
Lee

(10) Patent No.: US 11,240,972 B2
(45) Date of Patent: Feb. 8, 2022

(54) PLANTING CONTAINER

(71) Applicant: Song San Lee, Hsinchu (TW)

(72) Inventor: Song San Lee, Hsinchu (TW)

(*) Notice: Subject to any disclaimer, the term of this patent is extended or adjusted under 35 U.S.C. 154(b) by 75 days.

(21) Appl. No.: 16/810,780

(22) Filed: Mar. 5, 2020

(65) Prior Publication Data

US 2021/0274723 A1   Sep. 9, 2021

(51) Int. Cl.
*A01G 9/02* (2018.01)
*A01G 27/04* (2006.01)
*A01G 31/02* (2006.01)
*A01G 7/04* (2006.01)

(52) U.S. Cl.
CPC .............. *A01G 9/028* (2013.01); *A01G 7/045* (2013.01)

(58) Field of Classification Search
CPC .......... A01G 9/028; A01G 9/05; A01G 9/027; A01G 31/00; A01G 31/02; A01G 31/06; A01G 27/00; A01G 27/005; A01G 27/006; A01G 27/02; A01G 27/04; A01G 27/06
See application file for complete search history.

(56) References Cited

U.S. PATENT DOCUMENTS

| | | | | |
|---|---|---|---|---|
| 5,056,260 A | * | 10/1991 | Sutton | A01G 7/00 47/59 R |
| 9,433,159 B2 | * | 9/2016 | Kao | A01G 31/02 |
| 2004/0200142 A1 | * | 10/2004 | Ito | A01G 27/04 47/41.14 |
| 2014/0223819 A1 | * | 8/2014 | Coghlan | A01K 63/003 47/62 R |
| 2016/0021831 A1 | * | 1/2016 | Armstrong | A01G 9/02 47/66.1 |
| 2020/0128768 A1 | * | 4/2020 | Ho | A01G 27/005 |
| 2020/0305356 A1 | * | 10/2020 | Hansord | A01G 27/06 |

* cited by examiner

*Primary Examiner* — Kristen C Hayes

(57) ABSTRACT

A planting container has a first basin and a second basin forming a yin-yang shape. The first basin is configured to contain soil, the second basin is configured to hold water and provided with a plastic floating board. The plastic floating board has a plurality of receiving holes with a planting basket. An inner side of the plastic floating board faces the first basin and has at least one opening allowing at least one fiber strip to pass through the opening and enter the second basin, and another end of the fiber strip passes behind the first and second basin and placed on or in the soil of the first basin.

8 Claims, 5 Drawing Sheets

| Fiber Strip Width | Watering Amount |
|---|---|
| 12.5mm | 100cc |
| 25.0mm | 220cc |
| 37.5mm | 230cc |
| 51.0mm | 240cc |

FIG. 5

PLANTING CONTAINER

BACKGROUND of INVENTION

Field of Invention

The present invention relates to a planting container, and more particularly to an eco-friendly planting container.

Description of the Related Art

Currently, the planting containers are mostly using soil as a planting medium. Because soil needs water to dissolve nutrients for absorption by plant roots, it is necessary to regularly and quantitatively pour in appropriate water. For modern life style, people are usually busy. As a result, the plants are easily to be ignored and forgot to water, resulting in the plants not being able to effectively absorb nutrients and poor growth, or excessive watering, which will easily cause the roots of the plants to rot. Excessive water at the bottom of the planting containers not only causes soil loss, but also breeds mosquitoes and affects the environment. There is a need for improvement.

Therefore, it is desirable to provide a planting container to mitigate and/or obviate the aforementioned problems.

SUMMARY OF THE INVENTION

An objective of present invention is to a planting container, which is capable of improving the above-mention problems.

In order to achieve the above mentioned objective, a planting container has a first basin and a second basin forming a yin-yang shape. The first basin is configured to contain soil, the second basin is configured to hold water and provided with a plastic floating board. The plastic floating board has a plurality of receiving holes with a planting basket. An inner side of the plastic floating board faces the first basin and has at least one opening allowing at least one fiber strip to pass through the opening and enter the second basin, and another end of the fiber strip passes behind the first and second basin and placed on or in the soil of the first basin.

Preferably, a bottom of each of the first and second basin is provided with a first tube, and a second tube is selectively inserted into the first basin or the second basin and connected to the first tube; a top end of the second tube protrudes from the first basin or the second basin and is attached to an illuminating unit.

Preferably, an assembling notch is disposed at an upper edge of the first and second basin corresponding to the first tube, the assembling notch is attached with a limiting fastener having a C-shaped hook and a bolt and secured by a wing nut onto an outer wall of the first basin or the second basin.

Preferably, the illuminating unit is jacketed onto the second tube via a sleeve, an inner diameter of the sleeve being larger than an outer diameter of the second tube, such that the illuminating unit is capable of moving along the second tube and the sleeve is capable of being secured onto the second tube.

Preferably, two adjacent edges of the first and second basin respectively have a plurality of corresponding notches provided with a plurality of fasteners for securing purposes.

Preferably, the first basin further has at least one fiber strip, the fiber strip is arranged in a U shape and is buried in the soil, and a highest point of the fiber strip is not higher than a half height of the first basin.

Preferably, a diameter of the fiber strip is selected from one of 12.5 mm, 25.0 mm, 37.5 mm and 51.0 mm.

Preferably, first basin is suitable for soil cultivation, the second basin is suitable for hydroponics, and the combination of the first and second basins with at least a fiber strip placed on the surface of soil of the first basin from the second basin, so that the first basin can obtain a proper amount of water delivered from the second basin every day to ensure the moisture of soil and avoid excessive water inflow, to achieve the purpose of good planting and growth in the first basin. Furthermore, the second basin can also be used for culturing fish or aquatic organisms, so that the second basin achieves the purpose of symbiotic fish and vegetables, and fish excretion dissolved in water can not only be absorbed by hydroponic plants, but also be transported to the first basin through the fiber strip for soil-cultivated plants. Therefore, the planting container of the present invention have a variety of cultivation effects, which greatly enhances the practical use.

Preferably, the first and second basins and are symmetrical and correspondingly combined to form a yin-yang shaped container. When the structure can be manufactured in a combined mold to form the first and second basins, which reduces the production cost of structures.

Other objects, advantages, and novel features of invention will become more apparent from the following detailed description when taken in conjunction with the accompanying drawings.

BRIEF DESCRIPTION OF DRAWINGS

FIG. 5 is a schematic diagram of the width of the fiber strip and the corresponding water delivery volume of the preferred embodiment of the present invention.

DETAILED DESCRIPTION OF THE PREFERRED EMBODIMENT

Figure 1:
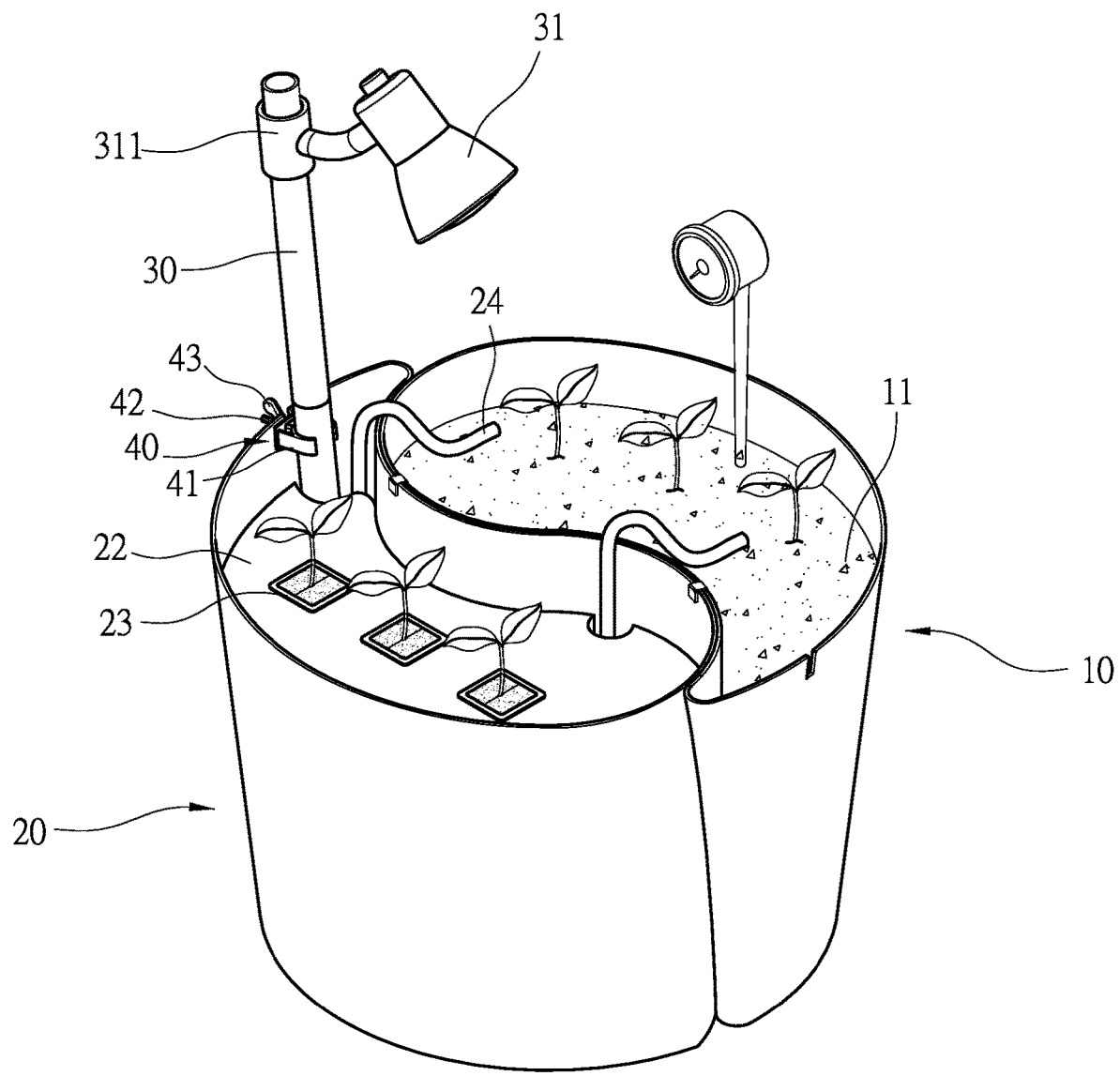
FIG. 1 is a three-dimensional view of a preferred embodiment of the present invention.
Figure 2:
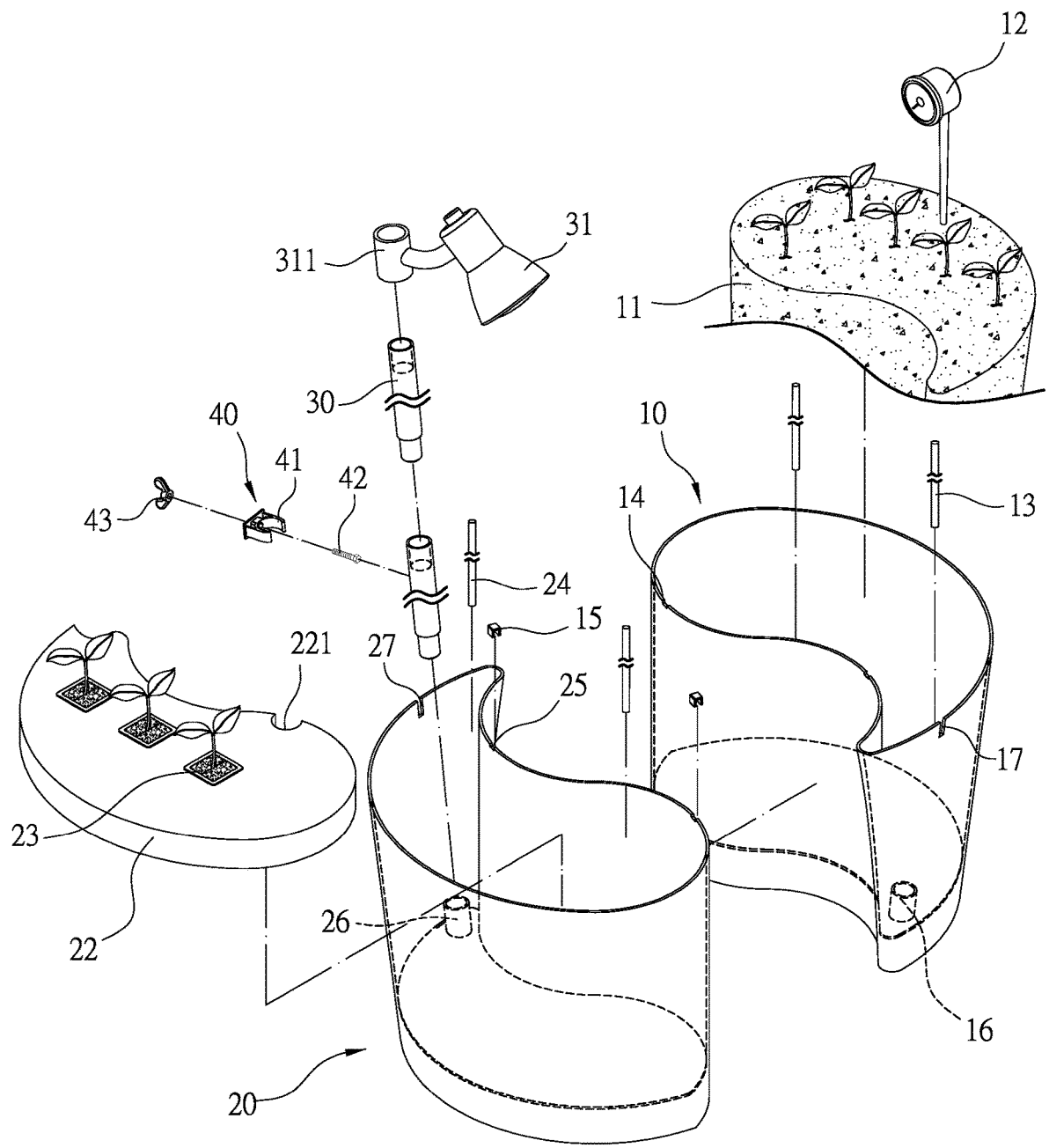
FIG. 2 is an exploded view of the preferred embodiment of the present invention.
Figure 3:
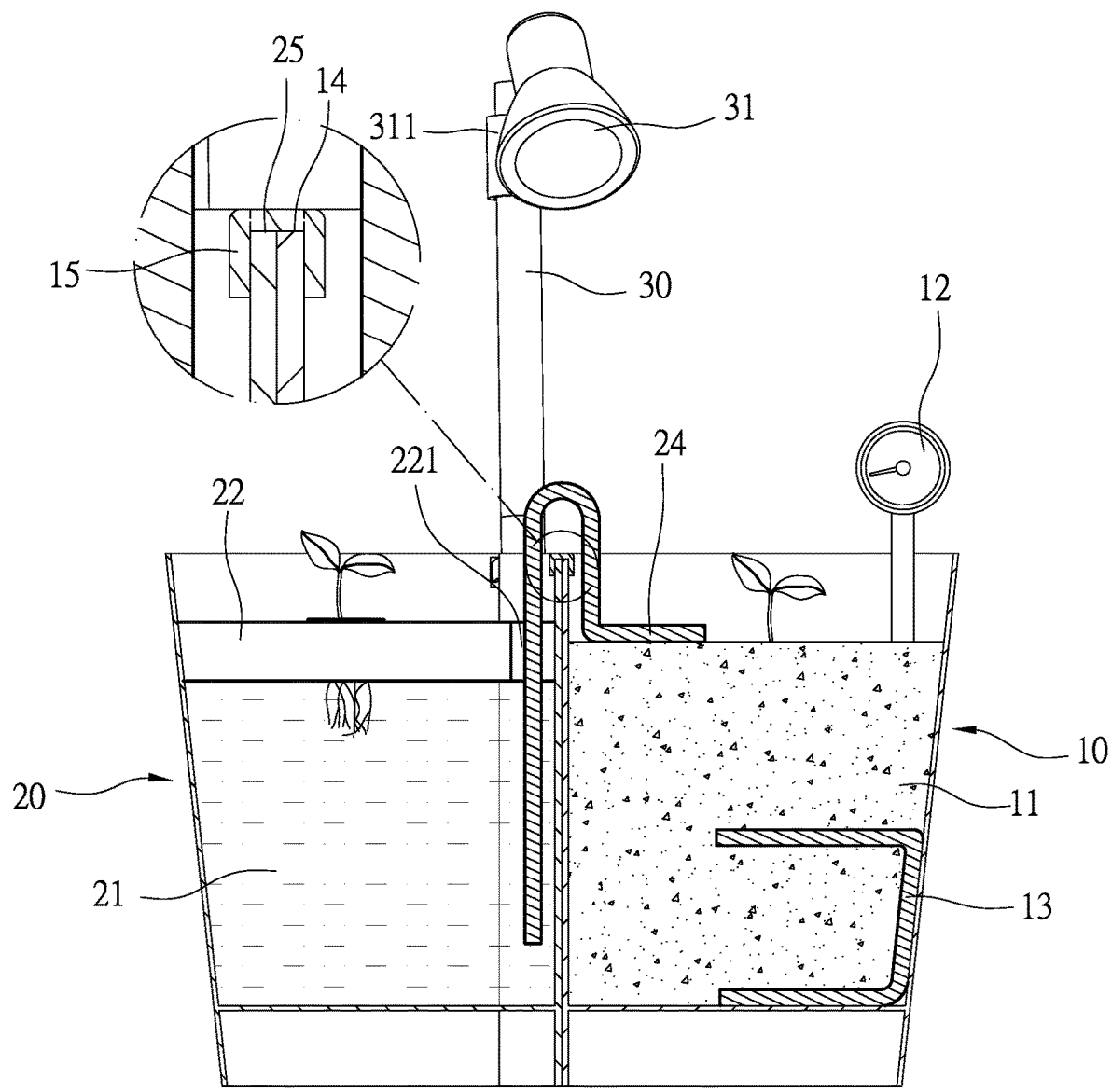
FIG. 3 is a sectional view of the composition of the preferred embodiment of the present invention.

First, please refer to FIGS. 1-3. A planting container has a first basin 10 and a second basin 20 forming a yin-yang shape. The first basin 10 is configured to contain soil 11 and a hygrometer is inserted into the soil for measuring moisture of the soil in the first basin. The first basin 10 further has at least one fiber strip 13, and the fiber strip 13 is arranged in a U shape and is buried in the soil 11, and a highest point of the fiber strip 13 is not higher than a half height of the first basin 10. The second basin 20 is configured to hold water 21 and provided with a plastic floating board 22. The plastic floating board 22 has a plurality of receiving hole (not shown) with a planting basket 23. An inner side of the plastic floating board 22 faces the first basin 10 and has at least one opening 221 allowing at least one fiber strip 24 to pass through the opening 221 and enter the second basin 20, and another end of the fiber strip 24 passes behind the first and second basin 10, 20 and is placed on or in the soil 11 of the first basin 10.

Two adjacent edges of the first and second basin 10, 20 respectively have a plurality of corresponding notches 14, 25 provided with a plurality of fasteners 15 for securing purposes, so the first and second basin 10, 20 are combined together to form yin-yang shape.

Figure 4:
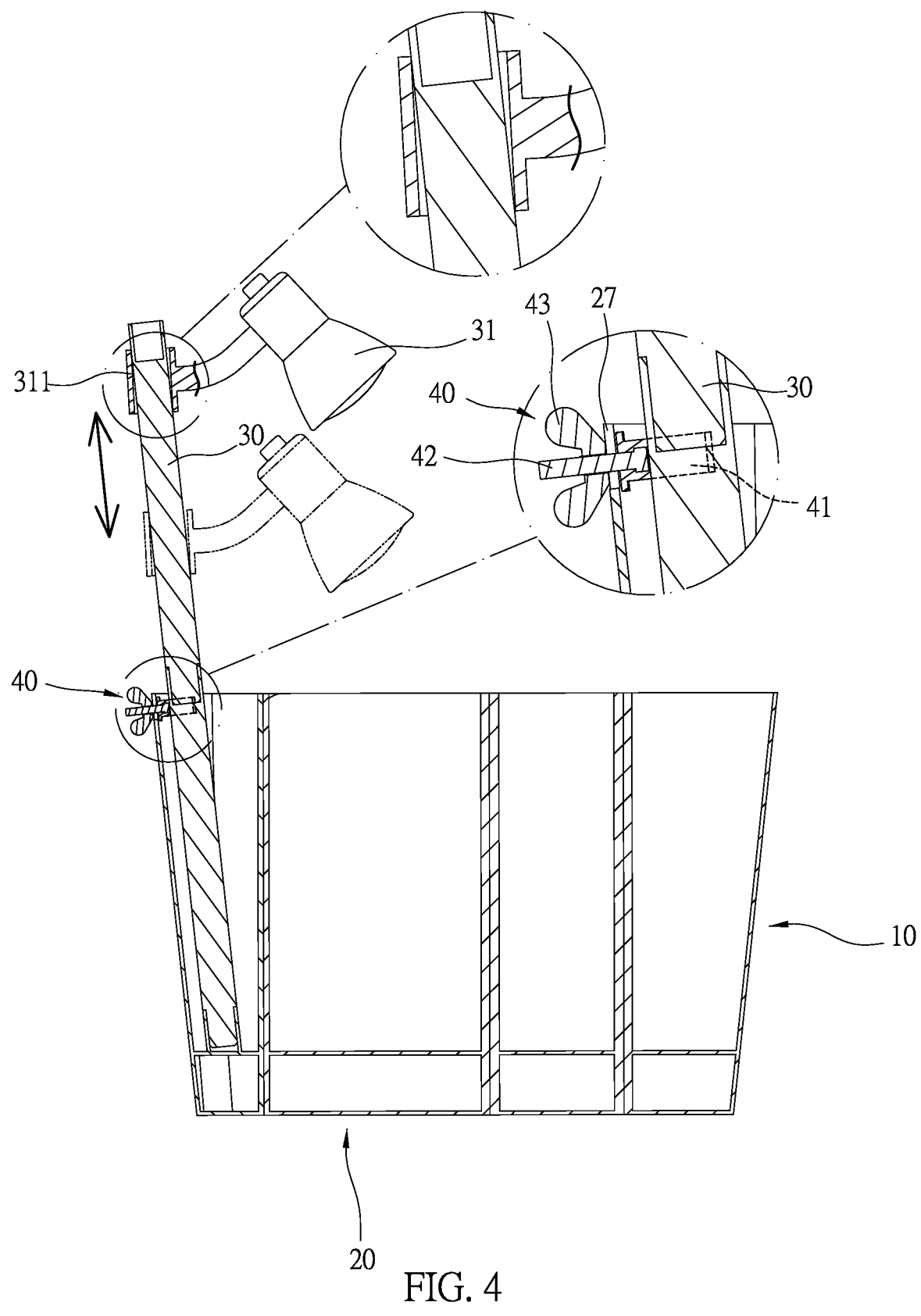
FIG. 4 is a schematic diagram of the lifting displacement of the illuminating unit according to preferred embodiment of the present invention.

A bottom of each of the first and second basin 10, 20 is provided with a first tube 16, 26, and a second tube 30 is selectively inserted into the first basin 10 or the second basin 20 and connected to the first tube 16, 26. A top end of the second tube 30 protrudes from the first basin 10 or the second basin 20 and is attached to an illuminating unit 31. The illuminating unit 31 is jacketed onto the second tube 30 via a sleeve 311, an inner diameter of the sleeve 311 is larger than an outer diameter of the second tube 30, such that the illuminating unit 31 is capable of moving along the second tube 30 and the sleeve 311 is capable of being secured onto the second tube 30, as shown in FIG. 4. Furthermore, an assembling notch 17, 27 is disposed at an upper edge of the first and second basin 10, 20 corresponding to the first tube 16, 26. The assembling notch 17, 27 is attached with a limiting fastener 40 having a C-shaped hook 41 and a bolt 42 and secured by a wing nut 43 onto an outer wall of the first basin 10 or the second basin 20.

For the actual use of the structure, please refer to FIGS. 1 and 3. The first basin 10 is filled with soil 11 and planting spices, vegetables, flowers or shrub plants. The second basin 20 is filled with water 21 and provided with the plastic floating board 22 having a plurality of the planting baskets 23. The planting baskets are installed with foam to fix plants or seeds suitable for hydroponics. The second basin 20 is suitable for keeping fish or aquatic organisms, and the excrement of fish or aquatic organisms can be dissolved in water to be used as nutrients for aquatic plants. The second basin 20 can be made of a transparent material, for watching joy.

Furthermore, the plants grown in the first basin 10 need proper water to dissolve the nutrients in the soil, so that the roots can absorb them and promote the growth of the plants. The water in the second basin 20 can be absorbed through at least a fiber strip 24 and led to the surface of soil 11 in the first basin 10, and then moisten soil 11 to achieve the purpose of daily water supply. The humidity of soil 11 in the first basin 10 can be observed through the hygrometer 12 daily.

In the actual operation of the above process, the first basin 10 is equipped with 7 gallons of soil 11, the second basin 20 is equipped with 7 gallons of water 21, which are used as automatic water supply through two of the fiber strips 24. Both of the fiber strips 24 are 40 cm long, 2.5 cm wide and 0.3 cm thick, half of the length is placed in the water, and the other half is placed on the surface of soil 11 across the first and second basin 10 and 20. The ends of the two fiber strips 24 extend to the center of the first basin 10, and then a hygrometer 12 is inserted into the soil 11 to measure the soil moisture daily. The indication scale on the hygrometer 12 is arranged between 1-10, between scale 0-3 indicates the soil is dry and not suitable for plant growth, between scale 4-7 indicates the soil 11 is wet and suitable for plant growth, and between scale 8-10 indicates that soil 11 is too wet to be suitable for plant growth. Through the capillary effect of the two fiber strips 24, the two fiber strips 24 can transport 380 cc of water to the soil 11 each day and maintain the hygrometer 12 between scale 4-7, to achieve good growth of plants.

In addition, the usage amount of the fiber strip 24 can be increased with the increase of the volume of the first and second basin 10, 20, to achieve a proper amount of water transport so that plants can grow stably and well.

Different widths of the fiber strip 24 can also affect the amount of moisture delivered to the soil 11 daily. The fiber strip 24 can have different specifications, as shown in FIG. 5, in order to achieve different daily water supply. when the width of the fiber strip 24 is 12.5 mm, the daily water delivery is 100 cc; when the fiber strip 24 is 25.0 mm in width, the daily water delivery is 220 cc; when the fiber strip 24 is 37.5 mm in width, the daily water delivery is 230 cc; and when the width of the fiber strip 24 is 51.0 mm, the daily water delivery is 240 cc. The width of the fiber strip 24 can be changed according to the plant, planting environment and container size and should not be limited.

Furthermore, at least a fiber strip 13 is provided in the first basin 10, please refer to FIG. 3. Preferably, two fiber strips 13 are provided, and each of the fiber strip 13 has a length 40 cm, a width 2.5 cm, and a thickness 0.3 cm. One third of its length (about 13 cm) is fixed at the bottom of the first basin 10, and one third of its length is bent upwards and fixed onto the inner wall of the first basin 10, then the soil 11 is added to secure the two-thirds of the fiber strip 13 in the first basin 10, the last one-third of the length is placed on the surface of soil 11, and the soil 11 fills the first basin 10 to bury at least fiber strip 13. At this time, the water at the bottom of the first basin 10 or the nutrient solution dissolved in the water can be brought to the upper layer of soil 11 through the capillary action of the fiber strip 13, for the roots of plants to absorb and grow and also removing the amount of water at the bottom of the container.

The illuminating unit 31 is installed with the second tube 30 in the planting container for providing the plant with light effect, so that the plant can grow healthily indoors without being suffered adverse effects of the external harsh outdoor environment, climate and insect pests. The illuminating unit 31 can be lifted and lowered along the second tube 30 to adjust its illumination height as the plant grows. As shown in FIG. 4, the light composition of the illuminating unit 31 includes high-intensity blue light and red light. Blue light improves photosynthesis effect, which promotes the growth of leaves and protein synthesis to reach fruit formation, and red light promotes the growth of rhizomes, helps flowering and fruiting, and prolongs flowering time.

With the structure of the above specific embodiment, the following benefits can be obtained: the first basin 10 is suitable for soil cultivation, the second basin 20 is suitable for hydroponics, and the combination of the first and second basins 10, 20 with at least a fiber strip 24 placed on the surface of soil 11 of the first basin 10 from the second basin 20, so that the first basin 10 can obtain a proper amount of water delivered from the second basin 20 every day to ensure the moisture of soil 11 and avoid excessive water inflow, to achieve the purpose of good planting and growth in the first basin 10. Furthermore, the second basin 20 can also be used for culturing fish or aquatic organisms, so that the second basin 20 achieves the purpose of symbiotic fish and vegetables, and fish excretion dissolved in water can not only be absorbed by hydroponic plants, but also be transported to the first basin 10 through the fiber strip 24 for soil-cultivated plants. Therefore, the planting container of the present invention have a variety of cultivation effects, which greatly enhances the practical use. Moreover, the first and second basins 10 and 20 are symmetrical and correspondingly combined to form a yin-yang shaped container. When the structure can be manufactured in a combined mold to form the first and second basins 10 and 20, which reduces the production cost of structures.

Although the present invention has been explained in relation to its preferred embodiment, it is to be understood that many other possible modifications and variations can be made without departing from the spirit and scope of invention as hereinafter claimed.

What is claimed is:

1. A planting container having a first basin and a second basin forming a yin-yang shape, the first basin configured to contain soil, the second basin configured to hold water and provided with a plastic floating board, the plastic floating board having a plurality of receiving holes with a planting basket, an inner side of the plastic floating board facing the first basin and having at least one opening allowing at least one fiber strip to pass through the opening and enter the second basin, and another end of the fiber strip passing behind the first and second basin and placed on or in the soil of the first basin.

2. The planting container as claimed in claim 1, wherein a bottom of each of the first and second basin is provided with a first tube, and a second tube is selectively inserted into the first basin or the second basin and connected to the first tube; a top end of the second tube protrudes from the first basin or the second basin and is attached to an illuminating unit.

3. The planting container as claimed in claim 2, wherein an assembling notch is disposed at an upper edge of the first and second basin corresponding to the first tube, the assembling notch is attached with a limiting fastener having a C-shaped hook and a bolt and secured by a wing nut onto an outer wall of the first basin or the second basin.

4. The planting container as claimed in claim 2, wherein the illuminating unit is jacketed onto the second tube via a sleeve, an inner diameter of the sleeve being larger than an outer diameter of the second tube, such that the illuminating unit is capable of moving along the second tube and the sleeve is capable of being secured onto the second tube.

5. The planting container as claimed in claim 1, wherein two adjacent edges of the first and second basin respectively have a plurality of corresponding notches provided with a plurality of fasteners for securing purposes.

6. The planting container as claimed in claim 1, wherein the first basin further has at least one fiber strip, the fiber strip is arranged in a U shape and is buried in the soil, and a highest point of the fiber strip is not higher than a half height of the first basin.

7. The planting container as claimed in claim 1, wherein a diameter of the fiber strip is selected from one of 12.5 mm, 25.0 mm, 37.5 mm and 51.0 mm.

8. The planting container as claimed in claim 1, wherein the first basin further comprises a hygrometer inserted into the soil for measuring moisture of the soil in the first basin.

\* \* \* \* \*